United States Patent [19]

Wiedenman et al.

[11] 4,334,287
[45] Jun. 8, 1982

[54] BUFFER MEMORY ARRANGEMENT

[75] Inventors: Gregory B. Wiedenman, Sandy; Phillip W. Marsh, Granger, both of Utah

[73] Assignee: Sperry Rand Corporation, New York, N.Y.

[21] Appl. No.: 29,305

[22] Filed: Apr. 12, 1979

[51] Int. Cl.³ .............................................. G06F 3/00
[52] U.S. Cl. ................................................... 364/900
[58] Field of Search ... 364/200 MS File, 900 MS File; 365/230

[56] References Cited

U.S. PATENT DOCUMENTS

| | | | |
|---|---|---|---|
| 3,526,878 | 9/1970 | Bennett et al. | 364/200 |
| 3,704,453 | 11/1972 | Blackwell et al. | 364/200 |
| 3,895,360 | 7/1975 | Cricchi et al. | 365/230 |
| 3,949,380 | 4/1976 | Barbour et al. | 364/200 |
| 4,065,810 | 12/1977 | Cramer et al. | 364/200 |
| 4,092,715 | 5/1978 | Scriver | 364/200 |
| 4,110,830 | 8/1978 | Krygowski | 364/200 |
| 4,149,244 | 4/1979 | Anderson et al. | 364/200 |

*Primary Examiner*—Raulfe B. Zache
*Attorney, Agent, or Firm*—Thorpe, North, Western & Gold

[57] ABSTRACT

A buffer memory arrangement for use in conjunction with a controller and a plurality of peripheral units and/or subsystems of a data processing system. The arrangement includes a dynamic RAM buffer memory for receiving and storing information from the peripheral units or subsystems and for supplying stored information to such units, an address pointer memory for storing buffer memory addresses identifying locations in buffer memory from which information is to be read or into which information is to be stored, and an encoder responsive to a request signal from a peripheral unit or subsystem for supplying an identity signal to the address pointer memory, which signal identifies the requesting peripheral unit or subsystem and specifies location in the address pointer memory containing buffer memory addresses which are to be applied to the buffer memory. Upon designating the location in buffer memory from which information is to be read or into which information is to be stored, the identified peripheral unit or subsystem signals the buffer memory to indicate that information is to be read or written; then, if information is to be written into the buffer memory, such information is supplied by the peripheral unit, and if information is to be read from the buffer memory, the buffer memory supplies such information to the requesting unit or subsystem.

9 Claims, 2 Drawing Figures

BUFFER MEMORY ARRANGEMENT

BACKGROUND OF THE INVENTION

This invention relates to a buffer memory arrangement for use in supplying data to or receiving data from a plurality of peripheral devices, subsystem components, or the like.

Buffer memories are used to buffer or temporarily store data that is to be transferred between components or subsystems of a system. Buffer memories may be employed in a variety of arrangements, for example, to buffer data transferred between subsystems of a data processing system, to buffer data transferred between peripheral units and a central processor of a data processing system, or in general to buffer data transferred between any elements of a data processing system.

Peripheral devices, subsystems, etc., typically gain access to a buffer memory of a system by one of two methods. In a first method, a central processing unit regularly polls the peripheral devices and/or subsystems in the course of carrying out its processing function to determine if a request for access is present. If it is, that request for access is treated as an "interrupt" and, if higher priority interrupts are not present, the central processing unit will branch or jump to a particular location in the instruction stream where the memory address of a desired service routine for servicing the request is located or generated. Polling offers the advantage of permitting very simple peripheral device design because most of the so-called intelligence or logic remains in the central processing unit. On the other hand, polling presents the disadvantage of delaying the servicing of a peripheral device request for access since the device must first be polled, and then it may even have to wait to be serviced.

A second method for gaining access to a buffer memory is the so-called direct memory access method. Here, peripheral devices and/or subsystems are allowed to interrupt the central processing unit without having to wait to be polled. Thus, inefficiencies of waiting which are associated with the polling method are eliminated but more complexity in the form of intelligence and logic must be designed into the peripheral devices so that the devices "know" what is wanted of the buffer memory (whether to write data into or read data from the memory) and the location or address in buffer memory where the operation is to take place.

SUMMARY OF THE INVENTION

It is an object of the present invention to provide a buffer memory arrangement in which peripheral units or subsystems of a system may gain access to a buffer memory in a new and efficient manner.

It is another object of the present invention to provide such an arrangement wherein the complexity normally required in peripheral units and/or subsystems for direct memory access is avoided.

It is a further object of the present invention, in accordance with one aspect thereof, to provide a novel and easily implementable buffer memory arrangement which utilizes a dynamic random access memory as the buffer memory.

These and other objects of the invention are realized in a specific illustrative embodiment of a buffer memory arrangement which is designed for use in a system having a processor and a plurality of peripheral units and/or subsystems which operate under the control of the processor. The arrangement includes a buffer memory into which data from the peripheral units or subsystems may be stored or from which data may be read for application to the peripheral units or subsystems. The buffer memory responds to a read or write signal from the peripheral units or subsystems to respectively supply information from or write information into locations identified by address information received from an address pointer memory. The address pointer memory includes a plurality of locations, each of which is dedicated to a different one of the peripheral units or subsystems. Buffer memory address information is stored in the address pointer memory and read therefrom in response to identity signals received from an encoder unit which produces such identity signals for identifying different ones of the peripheral units or subsystems. When data is to be applied to or received from the buffer memory by a peripheral unit, the peripheral unit makes a request of the encoder, and in response the encoder produces the identity signal identifying the particular peripheral unit. This identity signal is applied to the address pointer memory causing the memory to apply to the buffer memory a buffer memory address stored in the location dedicated to the requesting peripheral unit. The peripheral unit also applies a read or write signal to the buffer memory to cause data to respectively be read from or written into the location of the buffer memory identified by the buffer memory address received from the address pointer memory.

In accordance with one aspect of the invention, the buffer memory is a dynamic random access memory which includes rows and columns of memory elements. The location of these elements, which are either to store or to supply data, are identified by first identifying a particular row of memory elements and then by identifying a particular column. A portion of each buffer memory address stored in the address pointer memory designates the desired row and a portion designates the desired column. The buffer memory arrangement includes control logic for signalling the address pointer memory to apply a first portion of a buffer memory address to the buffer memory, and for signalling the buffer memory that this first portion represents the row identification of the desired location. The control logic also signals the address pointer memory to apply the latter portion of a buffer memory address to the buffer memory, and signals the buffer memory that this latter portion identifies the column location of the desired address. By making such a "double pass", any location in buffer memory can be identified.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
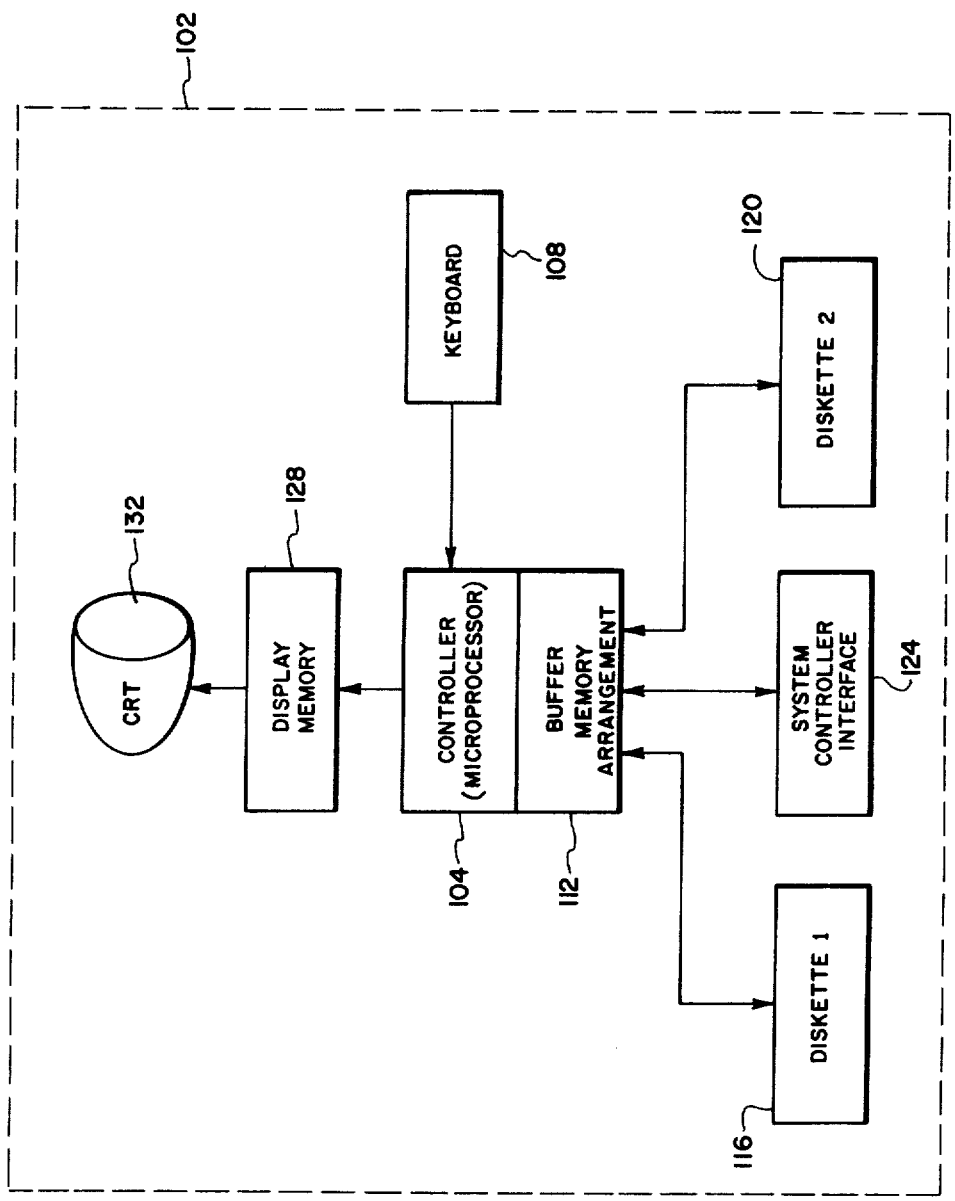
FIG. 1 shows a general block diagram of an illustrative data processing system in which the buffer memory arrangement of the present invention can be used.

Referring to the drawings, and particularly to FIG. 1, there is illustrated, in general block diagram form, a data processing system 102 comprised of a controller (or processor) 104, a data entry keyboard 108, a buffer memory 112, two peripheral diskette units 116 and 120, a system controller interface unit 124, a display memory 128, and a CRT display 132. The system 102 may be housed, as a unit, in desk-type casework, or any other suitable framework.

Information entered by an operator from the keyboard 108 is processed by the controller 104. This information may either serve as control signals (e.g., instructing the controller 104 to read data from a diskette unit 116 or 120), or comprise data to be stored on a flexible diskette of one of the peripheral diskette units 116 or 120, routed to another subsystem unit through the system controller interface 124, or displayed on the CRT display 132 after being stored in the display memory 128.

The controller 104 utilizes well known microprocessor technology with a read-only memory (ROM) to control the operation of the system 102. That is, it is the controller 104 which generates the various control signals for controlling operation of the system, such as interrupt handling and data flow control. The buffer memory 112 plays an integral role in all these activities inasmuch as most of the data is routed through and/or temporarily stored in the buffer memory. The buffer memory arrangement of the present invention could be used in a system such as that shown in FIG. 1.

Figure 2:
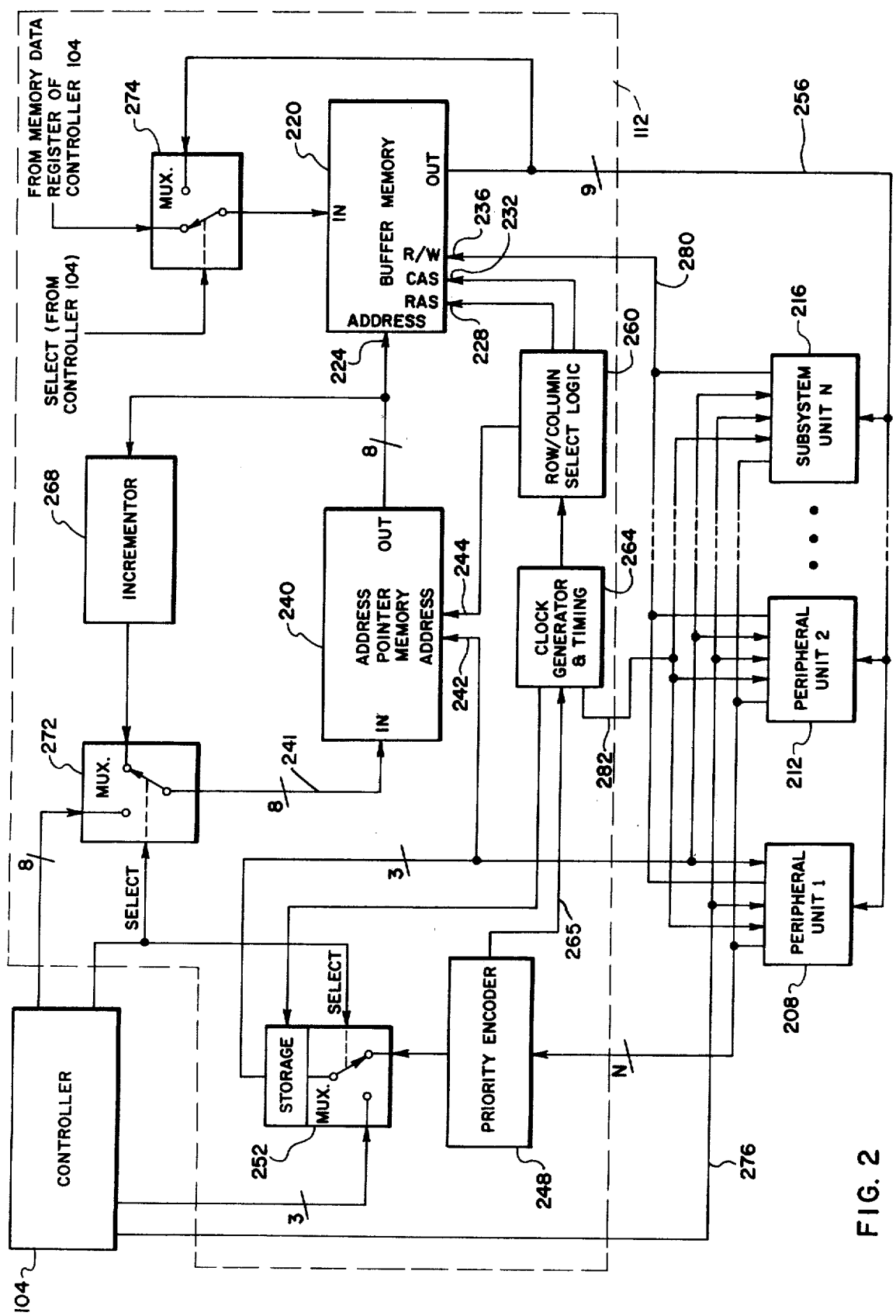
FIG. 2 is a schematic diagram of a buffer memory arrangement made in accordance with the principles of the present invention.

FIG. 2 shows a specific implementation of a buffer memory arrangement made in accordance with the present invention. The buffer memory arrangement may be used in a variety of environments and systems such as that described in connection with FIG. 1, provided some type of processor or controller 104 is included to initiate operations in the buffer memory. Also, such a system would include a plurality of peripheral units and/or subsystems (hereinafter referred to as peripheral units) 208 through 216 which, from time to time, would need access to the buffer memory for either applying data thereto or receiving data therefrom.

The buffer memory arrangement of the present invention includes a buffer memory 220 which might illustratively be a dynamic random access memory (RAM) such as that produced by National Semiconductor, Inc., and identified as MM 5270. Such buffer memory consists of rows and columns of memory elements or locations for storing data. The location into which data is to be written or from which data is to be read is identified by address information received over an address input 224. For any particular location, a two part address is received, one for identifying a row of the buffer memory and the other for identifying the column of the buffer memory. A signal received over a "row address select" (RAS) input 228 indicates to the buffer memory 220 that the portion of the address being received over the input 224 identifies the desired row, and a signal received over a "column address select" (CAS) input 232 indicates to the buffer memory 220 that that portion of the address then being received over input 224 identifies the desired column. A signal received on a read/write (R/W) input 236 indicates to the buffer memory that data is either to be read from or written into the location identified by the received buffer memory address information.

Also included is an address pointer memory 240 which includes a plurality of storage locations therein, each storage location being dedicated to a different one of the peripheral units 208 through 216. (Actually, for the specific implementation here described, two locations in the address pointer memory are dedicated to each peripheral unit, with the two locations containing the row and column buffer memory address. For simplicity of description, the two locations will be referred to as a single location, it being understood that the single location contains a two-part address.) Buffer memory addresses, which are supplied either by the controller 104 or an incrementor circuit 268 via a multiplexer 272, are stored in the address pointer memory to identify locations in buffer memory from which data is to be read or into which data is to be written. This address information is supplied to the buffer memory 220 via buffer memory input 224 in response to signals received via leads 242 and 244 which identifies the location in the address pointer memory 240 containing the buffer memory address to be supplied to the buffer memory. The address pointer memory 240 might illustratively be a circuit chip identified as No. 7489, produced by Texas Instruments, Inc.

The signals supplied to the address pointer memory 240 are received either from the controller 104 or a priority encoder 248 via a multiplexer and storage element 252. The priority encoder 248 receives request signals from the peripheral units 208 through 216 and responds by producing an identity signal which identifies the requesting peripheral unit. This identity signal is then supplied via the multiplexer and storage unit 252 both to the address pointer memory 240 and back to the requesting peripheral unit. In effect, the identity of the requesting peripheral unit is used to specify the location in the address pointer memory 240 dedicated to the peripheral unit and from which buffer memory address information is to be supplied to the buffer memory.

The priority encoder 248 serves a function similar to that described for the priority encode logic discussed in copending application, Ser. No. 29,157, filed Apr. 11, 1979, now issued as U.S. Pat. No. 4,237,535. In particular, the priority encoder 248, in response to one or more requests from the peripheral units 208 through 216, determines which of the requesting units has the highest priority and then produces an identity signal which identifies the highest priority unit. The priority encoder 248 might illustratively be a priority encoder identified as No. 74148, manufactured by Texas Instruments, Inc.

A particular peripheral unit, in response to receipt of an identity signal identifying that unit, supplies either a read or a write signal to the buffer memory 220 to advise the buffer memory that data is to be read from or written into the buffer memory respectively. The particular unit in question then either supplies data to or receives data from the buffer memory over a two-way bus 256.

Also included in the buffer memory arrangement of FIG. 2 is a row/column select logic unit 260 which is provided to signal the address pointer memory 240 when each portion of a buffer memory address is to be supplied to the buffer memory 220 to identify the row and column of the desired location in buffer memory. A clock generator and timing circuit 264 provides clock signals to various elements of the system and is of conventional design.

The buffer memory addresses identifying the locations in buffer memory from which data is to be read or into which data is to be written are supplied initially by the controller 104 via a multiplexer unit 272. After one such buffer memory address is then supplied by the address pointer memory 240 to the buffer memory 220, such buffer memory address is incremented by some predetermined amount by an incrementor circuit 268 which supplies the incremented buffer memory address back to the address pointer memory 240 over signal bus 241. This incremented buffer memory address identifies the next location in buffer memory from which data is to be read or into which data is to be written. In this manner, successive locations in the buffer memory 220 are identified for either reading data from or writing data into the locations. The incrementor circuit 268 might illustratively be a conventional adder in which a fixed quantity is added to each received address. The operation of the buffer memory arrangement of FIG. 2 will now be described.

Peripheral unit or subsystem access to the buffer memory 220 is initiated by the controller 104 in response, for example, to instructions keyed into the system by a user. The controller 104 determines that a particular peripheral unit is to have access to the buffer memory and supplies via the multiplexer unit 272 to the address pointer memory 240 over signal bus 241 a buffer memory address into which data is to be read or from which data is to be retrieved. The controller 104 also supplies an identity signal via the multiplexer and storage unit 252 to the address pointer memory 240 to specify the location in the address pointer memory where the buffer memory address is to be stored. This location, of course, is the location dedicated to the particular peripheral unit identified by the identity signal. This signal illustratively is a multibit word, the number of bits required being determined by the number of peripheral units to be identified.

The identity signal, in addition to being supplied to the address pointer memory 240 is also supplied to all of the peripheral units 208 through 216 to thereby notify the identified unit that it is to either supply data to or receive data from the buffer memory 220. The controller notifies the identified unit via bus 276 as to what the unit is to do, i.e., either supply data to or receive data from the buffer memory.

In response to receipt of its identity signal and the signal indicating that a read or write operation is to occur, the selected peripheral unit supplies a request signal to the priority encoder 248. Other requests may also be present at this time from other peripheral units.

The priority encoder 248 determines which peripheral unit has the highest priority and produces an identity signal identifying such unit, which signal is then applied to the multiplexer and storage unit 252. (The multiplexer and storage unit 252 will have been conditioned by the controller 104 so that the identity signal produced by the priority encoder will be routed to the storage element 254 of the multiplexer and storage unit.)

The priority encoder 248 then signals the clock generator and timing circuit 264 over signal line 265 to initiate the data retrieval or storage operation. The clock generator and timing circuit 264 signals the multiplexer and storage unit 252 to output the stored identity signal to the address pointer memory 240 and selected peripheral unit. The selected peripheral unit then supplies the appropriate read or write signal to the buffer memory 220 and clears its request signal (being supplied to the priority encoder 248). The clock generator and timing circuit 264 also signals the row/column select logic 260 which signals the address pointer memory 240 to indicate that the first portion of the buffer memory address stored in the location in the address pointer memory dedicated to the selected peripheral unit (and identified by the identity signal on lead 242) is to be supplied to the buffer memory 220. The row/column select logic 260 also applies a signal to input 228 of the buffer memory to indicate that the portion of the buffer memory address received on input 224 is for identifying the row of the desired location in buffer memory. Thereafter, the row/column select logic 260, in response to another signal from the clock generator and timing circuit 264, signals the address pointer memory 240 to supply the last portion of the buffer memory address to the buffer memory 220; and the select logic 260 also supplies a signal to input 232 of the buffer memory to indicate that that portion of the address then supplied identifies the column of the desired location in buffer memory. Following application of the signal to the input 232, the buffer memory examines the signal present on its R/W input 236 and then either stores the data present on the bus 256 and supplied via a multiplexer 274 from the selected peripheral unit (if a write signal is present), or supplies data to the bus 256 (if a read signal is present). In the latter case, the clock generator and timing circuit 264 signals the selected peripheral unit to receive data from the bus 256.

Following the reading or writing of each item of data, the selected peripheral unit applies another request signal to priority encoder 248 if more data is to be transferred. The process of servicing the request as described above will then be repeated, except for the following: As indicated earlier, after the initial buffer memory address is supplied to the address pointer memory 240, subsequent buffer memory addresses (for a particular block of data) are obtained from the incrementor circuit 268 which simply increments the last supplied buffer memory address by a fixed amount and supplies it back to the address pointer memory via the multiplexer 272. After all data desired has been supplied to or received from the buffer memory, the selected peripheral device raises an interrupt request to tell the controller that the desired data has either been received or supplied to the buffer memory.

In the manner described, a simple and yet efficient arrangement for accessing a buffer memory is provided. Specific illustrative circuits have been suggested for some of the elements shown in FIG. 2 whereas other of the elements are conventional circuits. For example, the multiplexers 272 and 274 could be commercially available multiple 2-line-to-1-line data selector/multiplexers which operate under control of the controller 104. The multiplexer and storage unit 252 could be a similar type selector/multiplexer having a storage capability. The peripheral units 208 through 216, although not forming part of the present invention, could be similar to the peripheral units discussed in the aforecited patent application.

It is to be understood that the above-described arrangement is only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A buffer memory arrangement for use in a system having a controller that controls a plurality of peripheral units, said controller being adapted to produce a plurality of control and address signals, including an initial address word for each peripheral unit, and each of said peripheral units being adapted to produce a request signal when it desires to supply or receive data and also to produce a corresponding write or read signal, said buffer memory arrangement including:

buffer memory means for receiving data from or supplying data to said peripheral units in response to write or read signals respectively, said data being stored in or read from locations specified by address data words;

address memory means including a plurality of memory locations, each of said memory locations being dedicated to a different peripheral unit and being adapted to store an address data word identifying a specific location in the buffer memory means, and to supply the address data word to said buffer memory means in response to a received identity signal;

priority encoder means coupled to said peripheral units and responsive to request signals received from said peripheral units for producing an identity signal which identifies a highest priority requesting peripheral unit;

means for supplying the identity signal produced by said priority encoder means to said address memory means;

means for supplying an address data word to a memory location of said address memory means identified by said identity signal;

address data word incrementing means for incrementing the address data word supplied by the address memory means to said buffer memory means, and for supplying said incremented address data word back to the means for supplying an address data word to a memory location of said address memory means;

means for supplying write or read signals from the identified peripheral unit to said buffer memory means;

first multiplexer means responsive to select control signals from the controller for supplying an address data word either from the controller or said incrementing means to a specific memory location of said address memory means as specified by said received identity signal supplied to the address memory means; and means for carrying data between the identified peripheral unit and said buffer memory means.

2. A buffer memory arrangement as defined in claim 1 further including second multiplexer means responsive to select control signals from the controller for supplying either the identity signal produced by said priority encoder means or an initial identity signal produced by said controller to said address memory means.

3. A buffer memory arrangement as defined in claim 2 wherein said second multiplexer means includes a storage element for storing and holding the selected identity signal supplied to said address memory means.

4. A buffer memory arrangement as defined in claim 2 wherein said buffer memory means comprises an array of memory elements arranged in rows and columns so that identification of a particular row and column in the array serves to identify a particular memory location from which data may be read or into which data may be written, said buffer memory including an address input for receiving the address data word from said address memory means, said address data word serving to identify the row and column of a desired memory location, and said buffer memory means further including a read/write input for receiving a signal indicating that either a read or a write operation is to occur.

5. A buffer memory arrangement as defined in claim 4 wherein said buffer memory means further includes a row select input which, when signaled, identifies the row specified by the address information on the address input, a column select input which, when signaled, identifies the column specified by the address information on the address input, and wherein said address memory means is adapted to supply a first portion of an identified address data word to the address input of the buffer memory means in response to a row select signal, and to supply a second portion of the address data word to the address input in response to a column select signal.

6. A buffer memory arrangement as defined in claim 5 further including row and column select logic for selectively applying row select and column select signals to said memory address means, and signals to said row select input and column select input of said buffer memory means, whereby said row select signal is applied to said memory address means in a timed relationship with the application of a signal to the row select input of said buffer memory means, and said column select signal is applied to said memory address means in a timed relationship with the application of a signal to the column select input of said buffer memory means.

7. A buffer memory arrangement as defined in claim 6 further including clock generator and timing circuitry for defining the timed relationships associated with the signals generated by said row and column select logic.

8. A buffer memory arrangement as defined in claim 7 wherein the timed relationships defined by said clock generator and timing circuitry are coordinated with an initiating signal received from said priority encoder means, said priority encoder means being adapted to generate the initiating signal whenever a request signal is received from one of said peripheral units.

9. A buffer memory arrangement as defined in claim 8 further including third multiplexer means responsive to select control signals from the controller for allowing either data from the highest priority peripheral unit or data from the controller to be written into a particular memory location of said buffer memory means.

* * * * *